HIGH SPEED CIRCUIT BREAKER WITH FLIP-FLOP MECHANISM

Original Filed March 22, 1965 2 Sheets-Sheet 1

INVENTOR
OTTO JENSEN
BY
OSTROLENK, FABER, GERB & SOFFEN
ATTORNEYS

HIGH SPEED CIRCUIT BREAKER WITH FLIP-FLOP MECHANISM

Original Filed March 22, 1965 2 Sheets-Sheet 2

INVENTOR.
OTTO JENSEN
BY
OSTROLENK, FABER, GERB & SOFFEN
ATTORNEYS

United States Patent Office

Re. 26,445
Reissued Aug. 27, 1968

26,445
HIGH SPEED CIRCUIT BREAKER WITH FLIP-FLOP MECHANISM

Otto Jensen, Malvern, Pa., assignor to I-T-E Circuit Breaker Company, Philadelphia, Pa., a corporation of Pennsylvania Original No. 3,302,144, dated Jan. 31, 1967, Ser. No. 441,647, Mar. 22, 1965. Application for reissue Dec. 5, 1967, Ser. No. 693,031
12 Claims. (Cl. 335—183)

Matter enclosed in heavy brackets [ ] appears in the original patent but forms no part of this reissue specification; matter printed in italics indicates the additions made by reissue.

*ABSTRACT OF THE DISCLOSURE*

*A high speed circuit breaker is provided with a double acting operating mechanism consisting of a ring-shaped conductive armature defining a short circuited winding connected to a shaft for controlling a movable contact and a pair of spaced windings on opposite sides of the armature positioned on a common axis and lying in spaced parallel planes with the armature. When a high impulse voltage is applied to the pair of windings, a current is induced in the armature in such a direction that the magnetic fields of the armature and the winding which it is closest to very strongly repel one another forcing the armature to move toward the other winding. Movement of the armature causes movement of the shaft and thereby movement of the contact.*

This invention relates to a novel extremely high speed circuit breaker having a double-acting operating mechanism whereupon a succession of operating signals automatically move the contacts of the circuit breaker sequentially between its open and closed positions with the contacts being self-latching in the open position.

A primary object of this invention is to provide a novel circuit breaker operating mechanism which is moved from open to closed and from closed to open positions by a succession of identical operating signals.

Another object of this invention is to provide a novel ultra high speed circuit breaker which has a minimum physical size and high physical strength.

Still another object of this invention is to provide a novel high speed circuit breaker having mechanical simplicity.

Yet another object of this invention is to provide a novel circuit breaker operating mechanism which provides ultra high speed opening and closing operation.

A still further object of this invention is to provide a novel circuit breaker having a simple electrical input circuit for both opening and closing the breaker.

Still another object of this invention is to provide a novel circuit breaker construction which has high insulation strength.

Another object of this invention is to provide a novel circuit breaker structure which permits ease of adjustment of the contact structure and the operating mechanism.

These and other objects of this invention will become apparent from the following description when taken in connection with the drawings, in which.

Figure 5:
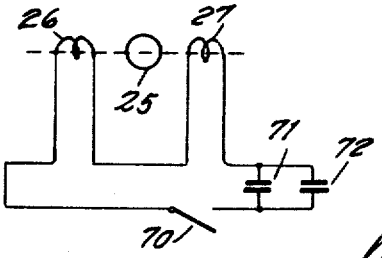

FIGURE 5 schematicallly illustrates the electrical connection between the drive coils and the armature which form a portion of the operating mechanism.

Figure 1:
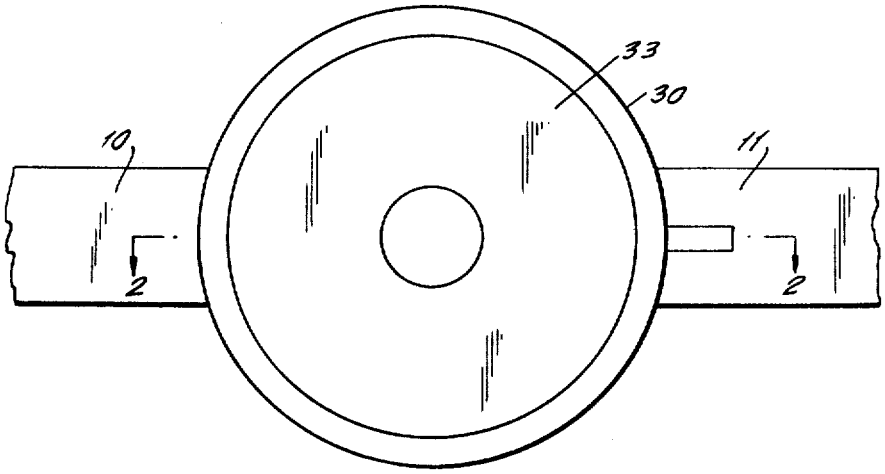
FIGURE 1 is a top view of the circuit breaker of the present invention.
Figure 3:
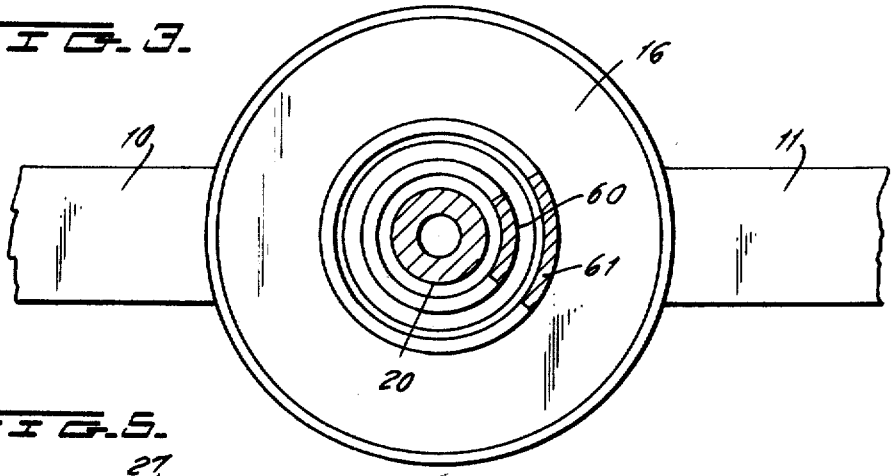
FIGURE 3 is a cross-sectional view of FIGURE 2 taken across the line 3—3 in FIGURE 2.
Figure 4:
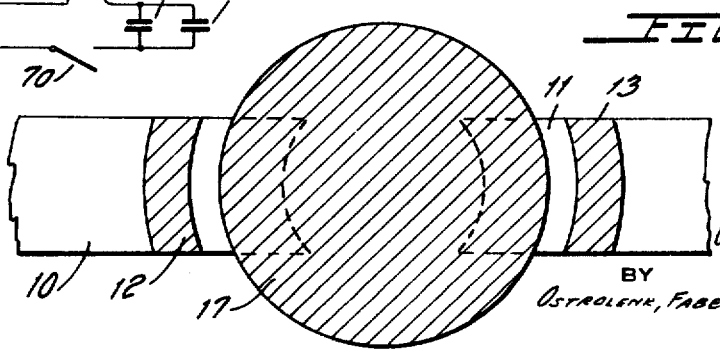
FIGURE 4 is a cross-sectional view of FIGURE 2 taken across the line 4—4 in FIGURE 2.
Figure 2:
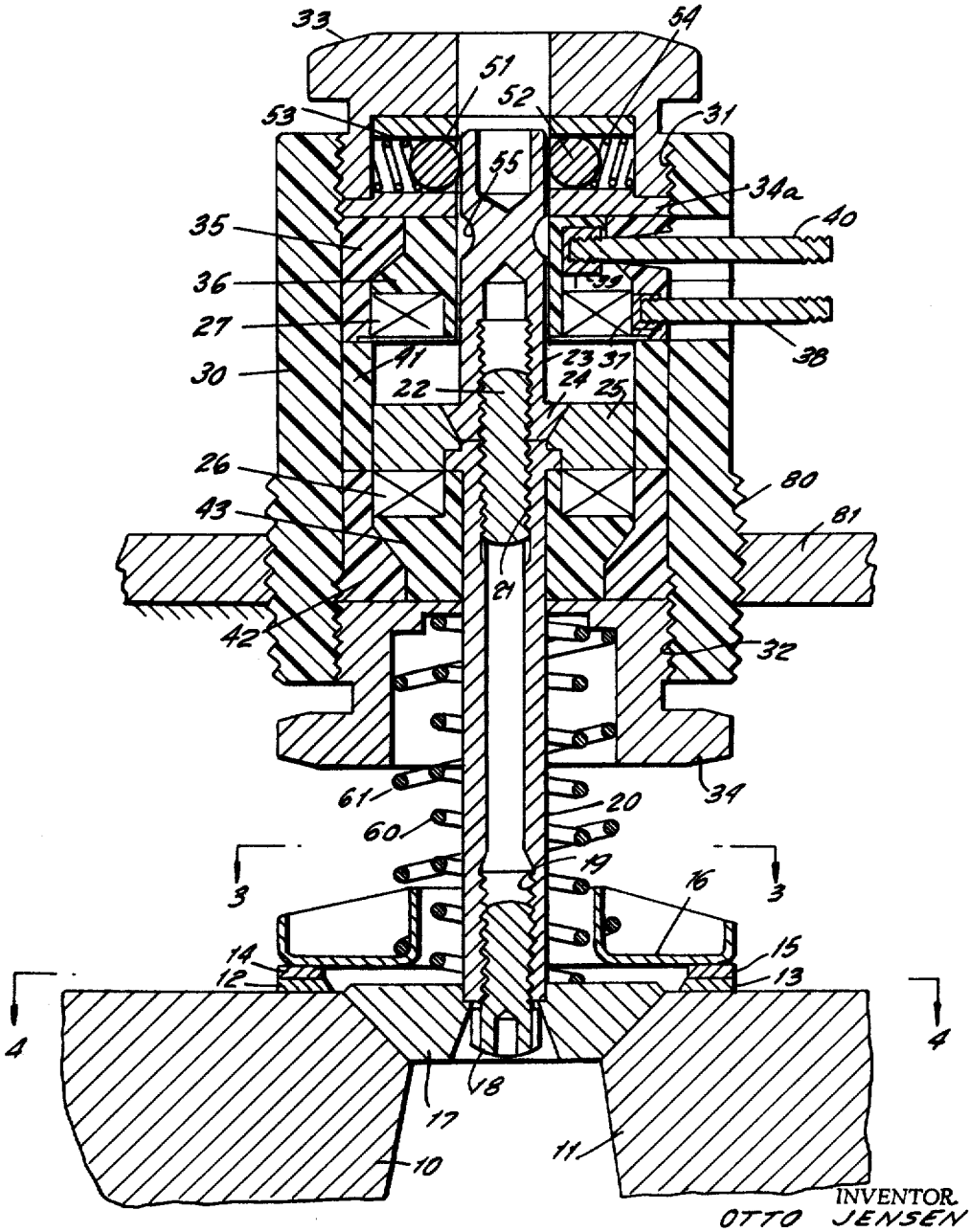
FIGURE 2 is a cross-sectional view of FIGURE 1 taken across the line 2—2 in FIGURE 1.

Referring now to the figures, I have schematically illustrated therein a circuit breaker having a flip-flop operating mechanism and which incudes main stationary contacts 10 and 11 which are suitably supported in any desired manner. Each of main stationary contacts 10 and 11 have arcuate arcing contact segments 12 and 13 secured thereto in any desired manner, as shown in FIGURES 2 and 4. The arcuate arcing contacts 12 and 13 cooperate with similarly arcuately lisposed moving arcing contact segments 14 and 15 which are carried by the disk-shaped moving arcing contact support 15, best shown in FIGURES 2 and 3. Thus, the disk-shaped conductor 16 serves as a bridge for the moving arcing contacts 14 and 15 secured thereto and which cooperate with stationary arcing contacts 12 and 13.

The main moving bridging contact 17, best shown in FIGURES 2 and 4, then moves into and out of a bridging contact relation with stationary main contacts 10 and 11 where FIGURE 2 illustrates bridging main contact 17 in the closed position. As will be understood more fully hereinafter, the moving contact 17 is movable upwardly in order to disengage the connection between stationary main contacts 10 and 11.

The main contact 17 is provided with an internal shoulder portion which receives the outwardly flared head of bolt 18 which is threaded into the internal thread 19 of main rod 20. The main rod 20 then has a second threaded portion 21 at its upper end which receives the lower threaded end of bolt 22. The upper threaded end of bolt 22 then threadably receives an operating rod extension 23 whereby the volt 22 threadably connects the main operating rod 20 and the rod extension 23 together.

The rod 23 has a tapered flange 24 which bears against the cooperating internal taper of conductive armature ring 25 and forces the armature ring 25 into engagement with the top of operating rod 21, as shown. Thus, a solid structure is formed including the bridging contact 18, main rod 20, rod extension 23, and the conductive armature 24.

A pair of windings 26 and 27 are then disposed on opposite sides of the ring-shaped armature 25 with the coil 26 surrounding operating rod 20 and coil 27 surrounding the extension 23. The coils 26 and 27 and the central movable structure are then supported by a structure which includes a coil casing 30 of insulation material and which could, for example, be formed of a wound epoxy filament suitably bonded to shape.

The coil casing 30 then has two end interior threaded sections 31 and 32 which threadably receive the upper cap 33 and lower cap 34, respectively. The upper cap 33 bears against a pressure plate 34 which, in turn, applies pressure to the insulation rings 35 and 36, respectively, wherein the coil 27 is captured between the disks 35 and 36. Note that the disk 35 contains therein a conductive slug 37 which threadably receives a coil terminal bolt 38, while disk 36 receives a similar conductive slug 39 which threadly receives the threaded coil terminal 40.

The terminals of coil 37 are then suitably connected to the conductive slugs 37 and 39 with external connection to the coil being made by the terminal bolts 38 and 40. It will be noted, however, that the terminals connected to bolts 38 and 40 may be the terminals formed of the series connection or parallel connection of coils 26 and 27, as will be described more fully hereinafter.

The outer disk 35 then seats against a spacer ring 41 which surrounds armature 25 and permits suffiicient clearance between the internal diameter of ring 41 and the external diameter of armature 25 to permit relative motion in the axial direction of armature 25.

The end of spacer 41 then seats against insulation disk 42 which is identical to disk 35 and cooperates with a second disk 43 which is identical to disk 36 to support the coil 26. The disks 42 and 43 are then rigidly held in position by the end cap 34.

It will be noted that the upper cap 33 has a large opening entering the bottom surface thereof adjacent the pressure plate 34a. The upper portion of this opening receives an upper disk 50 whereby a pair of balls 51 and 52 are captured between plates 50 and 34a, and are biased toward the axis of armature 25 by the biasing springs 53 and 54.

The operating rod extension 23 is then provided with a necked-down region 55 which is movable upwardly and adjacent the balls 51 and 52 which define a ball latch. Thus, when the bridging contact 17, operating rod 20, armature 25, and operating rod extensions 23 move upwardly, the ball latch, which includes balls 51 and 52, will seat into necked-down region 55 to hold the movable assemblage in this upper position by the force of biasing springs 53 and 54.

The bridging contact 17 is normally biased toward engagement with main contacts 10 and 11 by the biasing spring 60 which seats between the bottom of the cup-shaped member 34 and the top of the bridging contact 17.

In a similar manner, a second contact spring 61 which is concentric with spring 60 is captured in the larger diameter portion of member 34, and is received by the dish-shaped moving arcing contact 16. Thus, the spring biases for the arcing contacts and main contact are separated from one another, whereupon the main moving contact 17 will be disengaged from the main stationary contacts 10 and 11 prior to the disengagement of the cooperating arcing contacts.

The operation of the system is as follows:

When the armature 25 is in the position shown, it is very closely coupled to winding 26. Accordingly, when a suitable high impulse voltage is applied to coil 26, a current will be induced in armature 25 in such a direction that the magnetic fields of armature 25 and of coils 26 very strongly repel one another, whereupon a very strong force is applied to armature 25 tending to move it upwardly and away from coil 26. This upward motion will cause the entire movable assemblage to move, whereupon the stationary cooperating contacts disengage by the upward movement of contact 17 without any arcing, since the arcing contacts 12–14 and 13–15 are still engaged. Once the upper surface of bridging contacts 17 reaches the lower surface of dish-shaped member 16, however, the movable contact 17 carries the movable arcing contact or dish-shaped member 16 upwardly therewith, whereupon an arc is drawn between contacts 12–14 and 13–15 which are made of some suitable arc-resistant material. Once the necked-down portion 55 of rod 23 reaches the balls 51 and 52, they will be snapped into the necked-down region 55, thereby holding the complete assemblage in its disengaged position.

In this position, the armature 25 will be immediately adjacent coil 27. Therefore, if a second pulse is applied to coil 27, current will again be induced in armature 25 causing high repulsion forces between armature 25 and coil 27, thereby moving armature 25 downwardly and toward the engaged position. Note that the sequence of engagement is that the arcing contact 12–14 and 13–15 are the first to engage, thereby carrying any closing arcs which may be generated with the main movable contact 17 subsequently engaging the main contacts 10 and 11.

FIGURE 5 schematically illustrates the manner in which the coils 26 and 27 may be connected. Thus, in FIGURE 5, the coils 26 and 27 having the schematically illustrated armature or short circuited ring 25 disposed therebetween are connected in series with one another and with an operating switch 70. A capacitor 71 which can be charged by a suitable D.-C. source 72 are then connected in such a manner that the capacitor 71 is charged by the source 72 and is discharged through the series connected coils 26 and 27 with the closure of switch 70.

It is to be noted that the coils 26 and 27 may be connected either in series or parallel, whereby only a single pair of coil terminals need be taken through the coil casing 30. It is permissible to use a common circuit connection in this manner, since even though an operating inpulse will be applied to both coils 26 and 27, the repulsion force is strongly dependent upon the coupling of the armature 25 and the coil which is to repel it. That is to say, when moving from the engaged position of FIGURE 2 to the disengaged position, and if the same pulse is applied to coils 26 and 27, the coupling between coils 27 and 25 is so loose that there will be negligible repulsion forces between these elements, while substantial repulsion forces will exist between the very closely coupled coil 26 and armature 25.

It will be noted that the use of insulation material is preferable for the formation of the coil casing and the coil supports, since this avoids the possible formation of eddy currents in a metallic shell which would reduce the effective flux linkages acting on the armature. Moreover, adjustment of the entire mechanism will be seen to be easily accomplished by the threaded connections existing between the various components. Furthermore, ease of mechanical inspection and replacement of components is extremely simple, as will be apparent from the simple mechanism.

Clearly, the entire assemblage of FIGURE 2 will be suitably mechanically supported with respect to the stationary main contacts. By way of example, the outer housing 26 can have a threaded portion 80 which is threadably received by a mounting flange or surface 81 which is supported with respect to contacts 10 and 11.

Although this invention has been described with respect to its preferred embodiments, it should be understood that many variations and modifications will now be obvious to those skilled in the art, and it is preferred therefore that the scope of the invention be limited not by the specific disclosure herein, but only by the appended claims.

The embodiments of the invention in which an exclusive privilege or property is claimed are defined as follows:

1. An operating mechanism for a circuit interrupter; said circuit interrupter including a stationary contact, a movable contact movable into and out of engagement with said stationary contact, and a movable support shaft having said movable contact secured thereto and movable therewith; said operating mechanism including a non-magnetic ring-shaped conductive armature defining a short-circuited winding connected to said shaft and first and second spaced windings; said first and second spaced windings and said ring-shaped armature positioned on a common axis and lying in spaced parallel planes; said ring-shaped armature disposed between said first and second spaced windings; said movable support shaft moving between first and second positions respectively adjacent said first and second spaced windings; said first and second positions of said shaft corresponding to engagement and disengagement respectively of said movable and stationary contacts; said first and second windings having respective terminal connections; and voltage source means connected to said terminals whereby when said armature is adjacent one of said first or second windings, energization of said one of said first or second windings by said voltage source means causes high speed movement of said armature toward the other of said first or second windings; said voltage source means including a single pulse voltage source; said terminal connectors of said first and second windings connected to one another and to said single voltage source in a common circuit connection whereby said single pulse voltage source energizes both of said first and second windings simultaneously.

2. The device substantially as set forth in claim 1 wherein said shaft moves along the direction of the axis thereof; said ring-shaped armature and said first and second windings surrounding said shaft.

3. The device substantially as set forth in claim 1 which further includes biasing means connected to said movable contact for biasing said movable contact toward engagement with said stationary contact.

4. The device substantially as set forth in claim 2 which further includes housing means for rigidly supporting said first and second windings and movably receiving said shaft; said movable contact comprising a disk connected to the end of said shaft and extending beyond the bottom of said housing; and spring biasing means extending from said bottom of said housing to the top of said movable contact for biasing said movable contact downwardly and toward engagement with said stationary contact; said stationary contact comprising a first and second spaced conductors receiving the bottom of said movable contact in bridging relation.

5. A contact structure for a circuit interrupter; said contact structure including a movable contact movable into and out of engagement with a stationary contact; a movable shaft having said movable contact connected to one end thereof; a housing for slidably receiving said movable shaft; said movable contact comprising a disk connected to the end of said shaft and extending beyond the bottom of said housing; and spring biasing means extending from said bottom of said housing to the top of said movable contact for biasing said movable contact downwardly and toward engagement with said stationary contact; said stationary contact comprising a first and second spaced conductors receiving the bottom of said movable contact in bridging relation; and a movable arcing contact; said movable arcing contact comprising a ring-shaped member surrounding said shaft adjacent said movable contact and imposed above said movable contact; second biasing means connected to said bottom of said housing and to said movable arcing contact biasing said movable arcing contact downwardly; a pair of stationary arcing contacts connected to said first and second spaced conductors receiving the bottom of said arcing contact in bridging relation; the top of said movable contact moving into engagement with the bottom of said movable arcing contact when said movable contact moves out of engagement with said stationary contact thereby to subsequently move said movable arcing contact out of engagement with said stationary arcing contacts.

6. An operating mechanism for a circuit interrupter; said circuit interrupter including a stationary contact, a movable contact movable into and out of engagement with said stationary contact, and a movable support shaft having said movable contact secured thereto and movable therewith; said operating mechanism including a ring-shaped conductive armature defining a short-circuited winding connected to said shaft and first and second spaced windings; said first and second spaced windings and said ring-shaped armature positioned on a common axis and lying in spaced parallel planes; said ring-shaped armature disposed between said first and second spaced windings; said movable support shaft moving between first and second positions respectively adjacent said first and second spaced windings; said first and second positions of said shaft corresponding to engagement and disengagement respectively of said movable and stationary contacts; said first and second windings having respective terminal connections; and voltage source means connected to said terminals whereby when said armature is adjacent one of said first or second windings, energization of said one of said first or second windings by said voltage source means causes high speed movement of said armature toward the other of said first or second windings; said shaft movable along the direction of the axis thereof; said ring-shaped armature and said first and second windings surrounding said shaft; and biased latch means including a stationary mounted member biased toward the axis of said shaft and a reduced diameter portion in said shaft; said reduced diameter portion of said shaft receiving said biased latch means when said shaft moves to its said second position and adjacent said second winding thereby to latch said movable contact in its said deenergized position.

7. An operating mechanism for a circuit interrupter; said circuit interrupter including a stationary contact, a movable contact movable into and out of engagement with said stationary contact, and a movable support shaft having said movable contact secured thereto and movable therewith; said operating mechanism including a ring-shaped conductive armature defining a short-circuited winding connected to said shaft and first and second spaced windings; said first and second spaced windings and said ring-shaped armature positioned on a common axis and lying in spaced parallel planes; said ring-shaped armature disposed between said first and second spaced windings; said movable support shaft moving between first and second positions respectively adjacent said first and second spaced windings; said first and second positions of said shaft corresponding to engagement and disengagement respectively of said movable and stationary contacts; said first and second windings having respective terminal connections; and voltage source means connected to said terminals whereby when said armature is adjacent one of said first or second windings, energization of said one of said first or second windings by said voltage source means causes high speed movement of said armature toward the other of said first or second windings; said shaft movable along the direction of the axis thereof; said ring-shaped armature and said first and second windings surrounding said shaft; and housing means for rigidly supporting said first and second windings and movably receiving said shaft; said movable contact comprising a disk connected to the end of said shaft and extending beyond the bottom of said housing; said spring biasing means extending from said bottom of said housing to the top of said movable contact for biasing said movable contact downwardly and toward engagement with said stationary contact; said stationary contact comprising a first and second spaced conductors receiving the bottom of said movable contact in bridging relation; and a movable arcing contact; said movable arcing contact comprising a ring-shaped member surrounding said shaft adjacent said movable contact and imposed above said movable contact; said biasing means connected to said bottom of said housing and to said movable arcing contact biasing said movable arcing contact downwardly; a pair of stationary arcing contacts connected to said first and second spaced conductors receiving the bottom of said arcing contact in bridging relation; the top of said movable contact moving into engagement with the bottom of said movable arcing contact when said movable contact moves out of engagement with said stationary contact thereby to subsequently move said movable arcing contact out of engagement with said stationary arcing contacts.

*8. An operating mechanism for a movable member; said movable member movable between a first and second position; a movable support shaft having said movable member secured thereto and movable therewith; said operating mechanism including a non-magnetic ring-shaped conductive armature defining a short-circuited winding connected to said shaft and first and second spaced windings, said first and second spaced windings and said ring-shaped armature positioned on a common axis and lying in spaced parallel planes; said ring-shaped aramture disposed between said first and second spaced windings; said movable support shaft being movable between first and*

*second positions respectively, adjacent said first and second spaced windings; said first and second positions of said shaft corresponding to said first and second positions of said movable member respectively; said first and second windings having respective terminal connections and voltage source means connected to said terminals whereby when said armature is adjacent one of said first or second windings, energization of said one of said first or second windings by said voltage source means causes high speed movement of said armature toward the other of said first or second windings; said voltage source means including a single pluse voltage source; said terminal connectors of said first and second windings connected to one another and to said single pulse voltage source in a common circuit connection whereby said single pulse voltage source energizes both of said first and second windings simultaneously.*

*9. The operating mechanism as set forth in claim 8, further including a stationary member; said movable member being movable into and out of engagement with said stationary member; said first and second positions of said movable member corresponding to said engagement and disengagement respectively of said movable and stationary members.*

*10. The operating mechanism as set forth in claim 9, wherein said shaft moves along the direction of the axis thereof; said ring-shaped armature and said first and second windings surrounding said shaft.*

*11. The operating mechanism as set forth in claim 9, which further includes biasing means connected to said movable member for biasing said movable member toward engagement with said stationary member.*

*12. An operating mechanism for a movable member and a stationary member; said movable member movable into and out of engagement with said stationary member and a movable support shaft having said movable member secured thereto and movable therewith; said operating mechanism including a ring-shaped conductive armature defining a short circuited winding connected to said shaft and first and second spaced windings; said first and second spaced windings and said ring-shaped armature*

*positioned at a common axis and lying in spaced parallel planes; said ring-shaped armature disposed between said first and second spaced windings; said movable support shaft moving between first and second positions respectively adjacent said first and second spaced windings; said first and second positions of said shaft corresponding to engagement and disengagement respectively of said movable and stationary members; said first and second windings having respective terminal connections and voltage source means connected to said terminals, whereby when said aramature is adjacent one of said first or second windings, energization of said one of said first or second windings by said voltage source means causes high speed movement of said armature toward the other of said first or second windings; said shaft movable along the direction of the axis thereof; said ring-shaped armature and said first and second windings surrounding said shaft and biased latch means including a stationary mounted member biased toward the axis of said shaft and a reduced diameter portion in said shaft; said reduced diameter portion of said shaft receiving said biased latch means when said shaft moves to its said second position and adjacent said second winding thereby to latch said movable member in its said de-energized position.*

References Cited

The following references, cited by the Examiner, are of record in the patented file of this patent or the original patent.

UNITED STATES PATENTS

| | | | |
|---|---|---|---|
| 1,250,402 | 12/1917 | Wendelburg | 200—146 |
| 2,347,874 | 5/1944 | Bluemle | 200—163 |
| 2,544,719 | 3/1951 | O'Brien | 200—98 |
| 3,023,290 | 2/1962 | Jennings | 200—87 |
| 3,035,139 | 5/1962 | Lindsay | 200—111.1 |
| 3,071,714 | 1/1963 | Hadekel | 317—188 |

BERNARD A. GILHEANY, *Primary Examiner.*

H. BROOME, *Assistant Examiner.*